T. S. CRAPP.
COMBINED VEHICLE STORM FRONT AND SUN SHIELD.
APPLICATION FILED MAR. 15, 1909.
1,138,280.
Patented May 4, 1915.
2 SHEETS—SHEET 1.
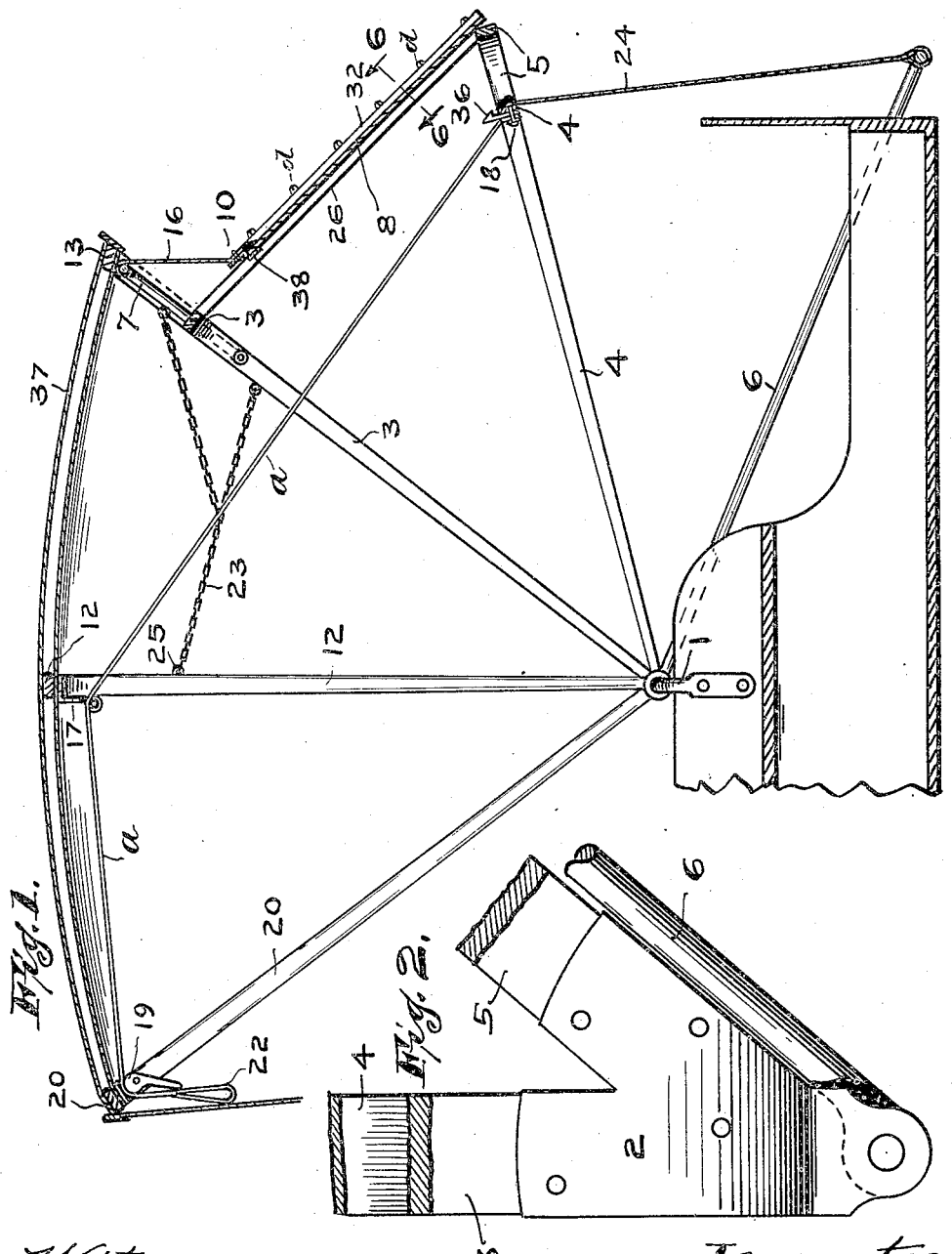
Witnesses;
Fred. H. Vogt
Albert E. Yeager,
Inventor,
Thomas S. Crapp.
By Minturn & Worner
Attorneys

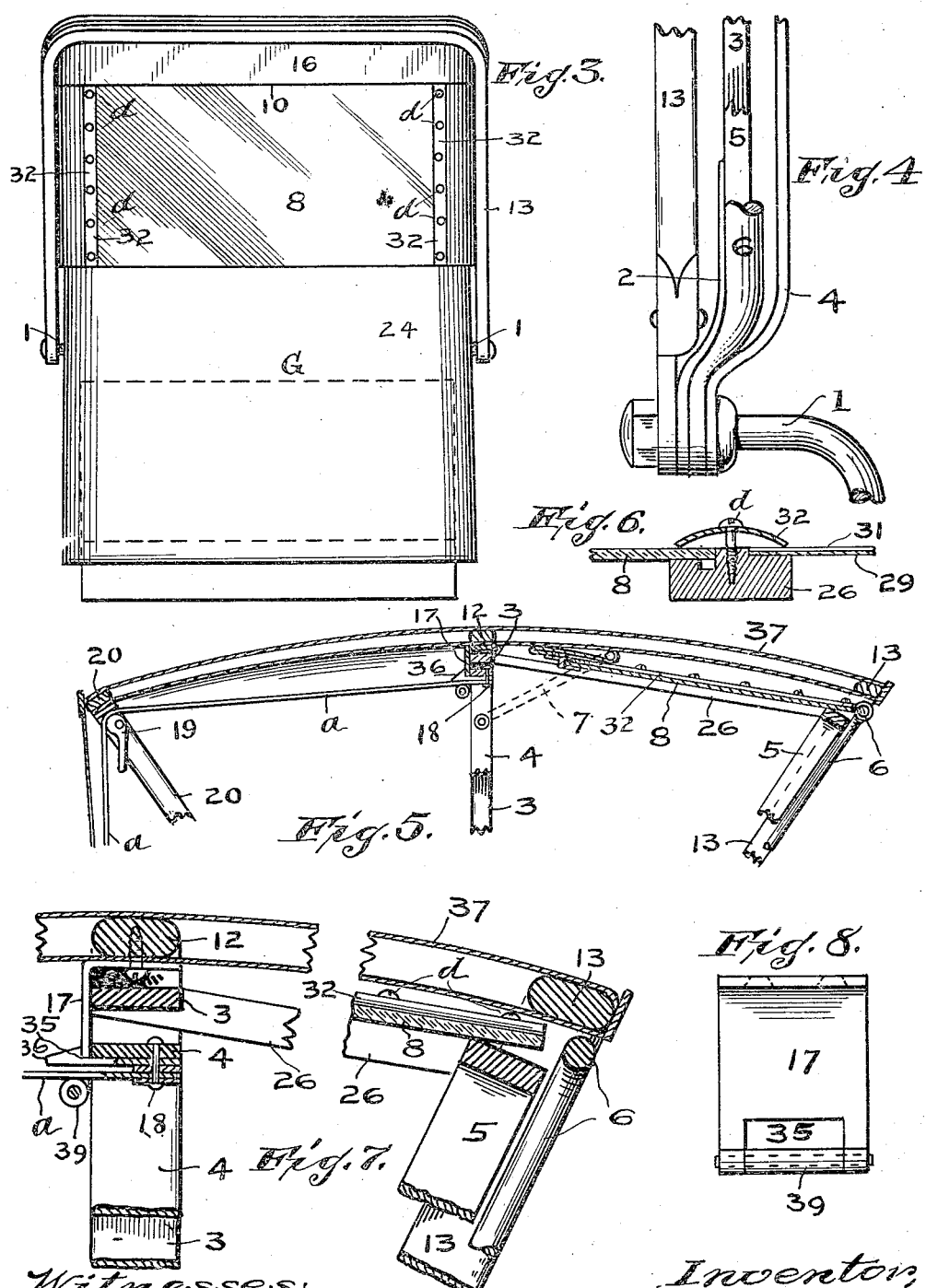

UNITED STATES PATENT OFFICE.

THOMAS S. CRAPP, OF INDIANAPOLIS, INDIANA, ASSIGNOR TO HENRIETTA CRAPP, OF INDIANAPOLIS, INDIANA.

COMBINED VEHICLE STORM-FRONT AND SUN-SHIELD.

1,138,280.  Specification of Letters Patent. Patented May 4, 1915.

Application filed March 15, 1909. Serial No. 483,617.

*To all whom it may concern:*

Be it known that I, THOMAS S. CRAPP, a citizen of the United States, residing at Indianapolis, in the county of Marion, State of Indiana, have invented a new and useful Combined Vehicle Storm-Front and Sun-Shield, of which the following is a specification.

My invention relates to a combined storm front and sun shield to operate in combination with any vehicle, street car, automobile, carriage, buggy, or wagon, having a suitable roof, top, or front, under which my device may be housed.

The object of my invention is to provide a device which may be applied to any vehicle, and which, when not in use may be housed or folded up so as to be scarcely observable.

A further object of my invention is to provide a complete protection for occupants and drivers of such vehicles against wind, rain, or snow, and to provide a shield which will protect the eyes of such occupants when driving toward the sun.

The object also is to provide a device of the above character which may be easily and quickly lowered or raised by a person within the vehicle in a seated position without rising from the seat.

A further object is to provide a device which will be inexpensive to construct, simple in its operations and adjustments, and durable.

I accomplish the objects of my invention by the mechanism illustrated in the accompanying drawings, in which—

Figure 1 is a longitudinal vertical section through the center of a single-seated top buggy equipped with my invention which is shown in its lowered or operative position. Fig. 2 is a detail in elevation, as viewed from the outside of the vehicle, showing the plate for uniting the two upper bows of my device to each other in a rigid manner and for their attachment to the "goose neck" of the buggy-top. Fig. 3 is a view in front elevation of the device as illustrated in Fig. 1. Fig. 4 is a detail in front view of the "goose neck" of a vehicle showing the attachment of the usual vehicle top bows and of the bows for my improved shield also mounted upon said "goose neck." Fig. 5 is a vertical central section of the upper portion of a vehicle top the same as illustrated in Fig. 1 with my invention applied thereto in its folded-up or housed position. Fig. 6 is a detail in cross section on the line 6—6 of Fig. 1. Fig. 7 is a detail in vertical section similar to that shown in Fig. 5, on a larger scale, with portions broken away, and Fig. 8 is a detail in side view of the stop-plate to which my device is locked in its housed position.

Like characters of reference indicate like parts throughout the several views of the drawings.

The bent bolt 1, commonly known as the "goose neck," which is supported by a secure attachment to some portion of the vehicle body, here shown as to the vehicle seat, and to which the usual buggy-top bows are pivotally attached is the point upon or about which my entire invention swings. If this bolt 1 for any reason is not available it will be necessary to provide a similar support contiguous thereto which will allow for the proper alinement of my device with the usual buggy bows when my invention is folded up or housed.

12 represents the middle bow, 13 the front oblique bow and 20 the rear oblique bow of a vehicle top of usual and well known construction, all of which bows are pivotally supported upon the "goose neck" 1, and in assembling the bows 3, 4, 5 and 6, which constitute the skeleton or framework of my invention, the bows 12, 13 and 20 are slipped off of the "goose necks" by removing the nuts on the outer ends of the latter and the eyes in the ends of bows 3, 4, 5 and 6 are inserted on said "goose necks." Then the bows 12, 13 and 20 are reattached and all are retained by the replacement of the nuts on the outer end of the "goose necks" 1. The bows 3 and 5 are secured to a hinge plate 2 (see Figs. 2 and 4) which holds said bows in rigid oblique relation to each other. The plate 2 is assembled on neck 1 outside of the eye which connects bow 6 with said neck, but the end is bent in a manner to bring the bow 6 in front of the bow 5 when the bow 6 is folded up against bow 5. The bow 4 is the innermost one of all of the bows and its sides are also shorter than any of the others whereby a suitable space between the tops of bows 4 and 5 is provided for the introduction of the driving lines when my device is in its lowered or operative position as will be more fully described hereinafter.

My improved storm front and shield is comprised of two principal parts or members, the upper of which (when the device is lowered ready for use) is bounded by the two rigidly conducted bows 3 and 5, and the lower of which is between the bows 4 and 6. The bows 4 and 6 are connected with each other by means of a flexible material 24 which will preferably be waterproof cloth with a smooth rubber finish on its outer surface.

The cross bars of the bows 3 and 5 are joined together adjacent their corner bends by means of the bars 26, preferably of wood. These bars 26 form the supports for a window 8, preferably of glass, the side edges of which extend over the bars 26 a sufficient distance to obtain the necessary support. The sides of the top member bounded by bows 3 and 5 are covered with suitable rubber cloth 31 and the curved corners at the junction of the sides with bars 26 will preferably be reinforced with sheet metal 29 (see Fig. 6). These metal and cloth edges will overlap the bars 26, and the joint between them and bar 26 and also between the glass 8 and the bar 26 will be covered and made wind-tight by the transversely curved metal strips 32 which are made fast to wooden bars 26 by screws $d$. The screws $d$ draw the side edges of metal strips 32 down so firmly against the cloth 31 and plate 8 that these parts are so securely clamped to the bars 26 as to require no additional fastenings to hold them on said bars 26. It will be observed that the lower end of glass 8 rests upon the upper corner of the bow 5 and extends beyond said corner a sufficient distance to form a good water-shed therewith. The upper end of the plate 8 extends to a horizontal metal angle-strip 38 supported by bars 26.

Pivotally secured to the outer sides of the bow 3 is an auxiliary bow 7 having an oilcloth cover 16, the lower edge of which is fastened to the transverse metal strip 38, the junction between the covering 16 and the top of the upper principal member of my device being designated by the numeral 10.

The limit of unfolding or downward movement of the upper principal member of my device is determined by means of a cable 23, one end of which is attached at 25 to the middle bow 12, and the other end of which is attached to the edge of bow 3. A branch of this cable extends to and is made fast to the auxiliary bow 7, whereby the latter will be made to assume the position which it occupies in Fig. 1 when the shield is lowered. This cable 23, however, permits the upper member bounded by bows 3 and 5 to be moved up as a whole to the housed position which is shown in Figs. 5 and 7, wherein it will be seen that the auxiliary bow 7 rests against the plate 32 on bar 26 and its cloth cover 16 folds to accommodate the new positions of its associated parts.

A strap $a$ has its front end attached to the bow 4, from whence it is continued to the stop-plate 17 fastened to the top of bow 12, and passing through a slot 35 in stop-plate 17 it is extended back to and over the eccentric end of a lever 19 which is pivotally attached to the rear bow 20. A loop 22 terminates the strap $a$ to form a hand-hold. By pulling on this end of the strap $a$ the bow 4 will be elevated on the "goose neck" 1 as a pivotal point, and by reason of the attachment of bow 6 to bow 4 through the cloth 24 the bow 6 will follow the upward swinging movement of bow 4 when the latter is raised by pulling on strap $a$. As previously stated, and as shown in Fig. 4, the bow 6 lies in front of the bow 5 with the result that when the lower principal member of my device bounded by bows 4 and 6 is drawn up by strap $a$ into the upper principal member of my device bounded by bows 3 and 5, the outer bow 6 will contact with the bow 5 and by a further pull upon the strap $a$ both of the two principal members of my device will be raised and will be swung around the "goose neck" 1 into a housed position under the top 37 of the vehicle (see Figs. 1 and 5). This top of the top member or member bounded by bows 3 and 5 is held straight and rigid by the bars 26 and the lower member, bounded by bows 4 and 6, is held taut and straight by contact of bow 6 against bow 5 and a sufficient pull on strap $a$ to engage the spring plate 17 with latch 36. The lower edge of spring plate 17 is sprung normally toward the rear of the vehicle whereby it presses constantly against the latch 36 thereby pressing its attached bow 4 to the rear and holding the flexible material 24 in a taut condition. The bow 4 is provided with a spring latch 36 which may be fastened to the bow by the same rivet 18 which attaches the strap $a$, and when the bow 4 is moved up far enough toward the bow 12 by pulling on strap $a$ the spring latch 36 will pass through the slot 35 of the stop-plate 17 and the plate 17 will arrest the further movement of the bow 4 and the spring latch will form a lock with the plate 17 whereby the bow 4 will be held in vertical position opposite the bow 12 and both of the principal members of my device will be retained in this housed position.

By making the bow 4 shorter than any of the other bows it is capable of free movement within the others without obstruction, but in addition it leaves a space when my device is lowered in position for use between it and the bow 5 as clearly seen in Fig. 1 for the driving lines to pass the storm front, and at the same time this rein-hole is on the lower side of the overhanging glass 8 so that wind, rain and snow, are excluded.

The lower bow 6 will preferably be round in cross section and made out of iron or brass to permit of readily bending it into shape to fit the contour of the vehicle on the outside of the dash.

While I have shown and described the preferred embodiment of my invention, it will be understood that I do not wish to be limited to the precise construction herein set forth, since various changes in the form, proportion, and minor details of construction may be resorted to without departing from the principle or sacrificing any of the advantages of this invention.

Having thus fully described my invention what I claim as new and wish to secure by Letters Patent of the United States, is—

1. A folding front for vehicle tops in a plurality of sections pivoted to oscillate independently of each other about a common axis, said sections occupying different altitudes when lowered to operative positions extending outside of and below the top of the dash when lowered for use, means when the bottom section is raised in housing the front to carry the other sections up with it, means for locking the housed front to the vehicle top, all of said sections being adapted to be let down with the vehicle top when the latter is lowered, and an auxiliary front folding on pivots above said common axis to regulate the opening between the lower folding front and the folding vehicle top.

2. A folding front for vehicle tops in a plurality of sections pivoted to oscillate independently of each other about a common axis, said sections occupying different altitudes when lowered to operative positions extending outside of and below the top of the dash when lowered for use, means when the bottom section is raised in housing the front to carry the other sections up with it, means for locking the housed front to the vehicle top, means for raising said lower section, all of said sections being adapted to be let down with the vehicle top when the latter is lowered, and an auxiliary front folding on pivots above said common axis to regulate the opening between the lower folding front and the folding vehicle top.

3. A folding front for vehicle tops in a plurality of sections pivoted to oscillate independently of each other about a common axis, said sections occupying different altitudes when lowered to operative positions extending outside of and below the top of the dash when lowered for use, means when the bottom section is raised in housing the front to carry the other sections up with it, means for locking the housed front to the vehicle top, means for raising the lower section comprising a strap attached thereto and an elevated support over which the strap passes, all of said sections being adapted to be let down with the vehicle top when the latter is lowered, and an auxiliary front folding on pivots above said common axis to regulate the opening between the lower folding front and the folding vehicle top.

4. A folding front for vehicle tops in a plurality of sections pivoted to oscillate independently of each other about a common axis, said sections occupying different altitudes when lowered to operative positions extending outside of and below the top of the dash when lowered for use, means when the bottom section is raised in housing the front to carry the other sections up with it, means for locking the housed front to the vehicle top, means for lowering the lower section comprising a strap attached thereto, an elevated support over which the strap passes, means for locking the strap at any given position to hold and support the front, all of said sections being adapted to be let down with the vehicle top when the latter is lowered, and an auxiliary front folding on pivots above said common axis to regulate the opening between the lower folding front and the folding vehicle top.

5. The combination with a folding vehicle top of a folding front for said top in a plurality of sections pivoted to oscillate independently of each other about a common axis which is also the axis of movement for the folding top, said sections occupying different altitudes when lowered to operative positions extending outside of and below the top of the dash when lowered for use, means when the bottom section is raised in housing the front to carry the other sections up with it, means for locking the housed front to the vehicle top, all of said sections being adapted to be let down with the vehicle top when the latter is lowered, and an auxiliary front folding on pivots above said common axis to regulate the opening between the lower folding front and the folding vehicle top.

6. The combination with a folding vehicle top of a folding front for said top in a plurality of sections pivoted to oscillate independently of each other about a common axis which is also the axis of movement for the folding top, said sections occupying different altitudes when lowered to operative positions extending outside of and below the top of the dash when lowered for use, means when the bottom section is raised in housing the front to carry the other sections up with it, means for locking the housed front to the vehicle top, all of said sections being adapted to be let down with the vehicle top when the latter is lowered, a strap attached to said lower section, a support attached to the inside of the vehicle top over which the strap passes, and a clamp for holding a given position of the strap.

7. The combination with a folding vehicle top of a folding front for said top in a plurality of sections pivoted to oscillate independently of each other about a common axis which is also the axis of movement for the folding top, said sections occupying different altitudes when lowered to operative positions, means when the bottom section is raised in housing the front to carry the other sections up with it, a strap attached to said lower section, a stop-plate attached to the inside of and at the top of the vehicle top, said plate having a slot through which the strap passes, and a latch hook carried by said lower section of the folding front adapted to pass through the slot in the stop-plate by a manipulation of the strap.

8. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, a pair of bows bounding the upper section and rigidly spaced apart, a pair of bars connecting the cross-bars of said pair of bows, and a transparent sheet supported by said bars.

9. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, a pair of bows bounding the upper section and rigidly spaced apart, a pair of bars connecting the cross-bars with said pair of bows, a glass light supported upon said bars and projecting over the lower bow to form a water-shed, side coverings for said upper section overlapping said parallel bars, and metal strips covering and closing the joints of the glass and side coverings upon said parallel bars.

10. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, a pair of rigidly spaced-apart bows bounding said upper section, a pair of bars connecting the cross-bars of said pair of bows, a glass light supported upon said bars and projecting over the lower bar to form a water-shed, side coverings for said upper section overlapping said parallel bars, concave metal strips covering and closing the joints of the glass and side coverings upon said parallel bars and screws passing through the strips into the bars to impinge the glass and side coverings between said metal strips and bars.

11. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, an auxiliary bow pivoted at the vertical springing line to the top bow of the top section, means for securing the auxiliary bow in operative position, a flexible cover attached at one edge to the auxiliary bow and at another edge to said top section, and means for simultaneously raising said sections and auxiliary bow.

12. The combination with a folding vehicle top of a folding front in a plurality of sections pivoted to oscillate independently of each other about a common axis, said sections occupying different altitudes when lowered to operative positions, means when the bottom section is raised on housing the front to carry the other sections up with it, an auxiliary bow pivoted at the vertical springing line to the top bow of the top section, a flexible cover attached at one edge to the auxiliary bow and at another edge to said top section, and means to determine the lowered or operative positions of said top section and auxiliary bow.

13. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, means for locking the housed front to the vehicle top, an auxiliary bow pivoted at the vertical springing line to the top bow of the top section, means for securing the auxiliary bow in operative position, a flexible cover attached at one edge to the auxiliary bow and at another edge to said top section, and a cable to determine the lowered position of the top section and auxiliary bow.

14. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, an auxiliary bow pivoted at the vertical springing line to the top bow of the top section, a flexible cover attached at one edge to the auxiliary bow and at another edge to said top section, and a cable to determine the lowered position of the top section, said cable having a branch connected with said auxiliary bow to determine its operative position.

15. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, means for locking the housed front to the vehicle top, means for raising the lower section comprising a strap attached thereto, an elevated support over which the strap passes, an eccentric lever for locking the strap to hold a given position of the front, and an auxiliary front folding up against the vehicle top by connection with said strap.

16. The combination with a folding vehicle top of a folding front in a plurality of sections pivoted to oscillate independently of each other about a common axis, said sections occupying different altitudes when lowered to operative positions, means when the bottom section is raised in housing the front to carry the other sections up with it, means for raising the lower section comprising a strap attached thereto, an elevated support over which the strap passes, an eccentric lever for locking the strap to hold a given position of the front, an auxiliary bow pivoted to the top bow of the top section, a flexible cover having one edge attached to the auxiliary bow and another edge attached to said top section, and a cable to determine the lowered position of the top section, said cable having a brace connected with said auxiliary bow to determine its operative position.

17. The combination with a folding vehicle top, of a lower folding front for said top in a plurality of sections pivoted to oscillate independently of each other about a common axis, said sections occupying different altitudes when lowered to operative positions, all of said sections folding up under the vehicle top, means for locking the housed front to the vehicle top, means for holding the top portions of said sections taut in their closed positions, and an auxiliary independently pivoted upper front folding between the vehicle top and said lower folding front.

18. The combination with a folding vehicle top, of a lower folding front for said top in a plurality of sections pivoted to oscillate independently of each other about a common axis, said sections occupying different altitudes when lowered to operative positions, all of said sections folding up under the vehicle top, means for locking the housed front to the vehicle top, means for holding the top portions of said sections taut in both open and closed positions, and an auxiliary independently pivoted upper front folding between the vehicle top and said lower folding front.

19. The combination with a folding vehicle top, of a lower folding front for said top in a plurality of sections pivoted to oscillate independently of each other about a common axis, said sections occupying different altitudes when lowered to operative positions, means when the bottom section is raised in housing the front to carry the other sections up with it, all of said sections folding up under the vehicle top, means for locking the housed front to the vehicle top, means for holding the top portions of said sections taut in their closed positions, and an auxiliary independently pivoted upper front folding between the vehicle top and said lower folding front.

20. The combination with a folding vehicle top having a metal plate depending from the inside thereof, said plate being slotted to engage a catch, of a folding front for said top in a plurality of sections pivoted to oscillate independently of each other about a common axis, said sections occupying different altitudes when lowered to operative positions, means when the bottom section is raised in housing the front to carry the other sections up with it, a latch-hook carried by said bottom section and adapted to form locking engagement with said plate depending from the vehicle top, all of said sections folding up under the vehicle top, and an auxiliary folding front above said sections and below the vehicle top.

In testimony whereof I have signed my name to this specification in the presence of two subscribing witnesses.

THOMAS S. CRAPP.

Witnesses:
A. J. BAKER,
ED C. REMMETTER.

Copies of this patent may be obtained for five cents each, by addressing the "Commissioner of Patents, Washington, D. C."